(12) United States Patent
Archer et al.

(10) Patent No.: US 7,487,393 B2
(45) Date of Patent: *Feb. 3, 2009

(54) TEMPLATE BASED PARALLEL CHECKPOINTING IN A MASSIVELY PARALLEL COMPUTER SYSTEM

(75) Inventors: Charles Jens Archer, Rochester, MN (US); Todd Alan Inglett, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/104,284

(22) Filed: Apr. 16, 2008

(65) Prior Publication Data

US 2008/0195892 A1     Aug. 14, 2008

Related U.S. Application Data (63) Continuation of application No. 11/106,010, filed on Apr. 14, 2005.

(51) Int. Cl.
G06F 11/00     (2006.01)
(52) U.S. Cl. .............................. 714/15; 714/6; 714/20
(58) Field of Classification Search ................... 714/11, 714/12, 20, 43, 47, 6, 15
See application file for complete search history.

(56) References Cited

U.S. PATENT DOCUMENTS

| | | | | |
|---|---|---|---|---|
| 5,630,047 A | * | 5/1997 | Wang | 714/15 |
| 5,712,971 A | * | 1/1998 | Stanfill et al. | 714/34 |
| 5,845,082 A | * | 12/1998 | Murakami | 709/226 |
| 5,922,078 A | * | 7/1999 | Hirayama et al. | 714/16 |
| 5,941,999 A | * | 8/1999 | Matena et al. | 714/6 |
| 5,974,425 A | * | 10/1999 | Obermarck et al. | 707/202 |
| 5,996,088 A | * | 11/1999 | Frank et al. | 714/6 |
| 6,052,799 A | * | 4/2000 | Li et al. | 714/13 |

(Continued)

OTHER PUBLICATIONS

Cummings, D.; Alkalaj, L., "Checkpoint/rollback in a distributed system using coarse-grained dataflow," Fault-Tolerant Computing, 1994. FTCS-24. Digest of Papers, Twenty-Fourth International Symposium on, pp. 424-433, Jun. 15-17, 1994.

(Continued)

*Primary Examiner*—Marc Duncan
*Assistant Examiner*—Joshua P Lottich
(74) *Attorney, Agent, or Firm*—Martin & Associates, LLC; Bret J. Petersen (57) ABSTRACT

A method and apparatus for a template based parallel checkpoint save for a massively parallel super computer system using a parallel variation of the rsync protocol, and network broadcast. In preferred embodiments, the checkpoint data for each node is compared to a template checkpoint file that resides in the storage and that was previously produced. Embodiments herein greatly decrease the amount of data that must be transmitted and stored for faster checkpointing and increased efficiency of the computer system. Embodiments are directed to a parallel computer system with nodes arranged in a cluster with a high speed interconnect that can perform broadcast communication. The checkpoint contains a set of actual small data blocks with their corresponding checksums from all nodes in the system. The data blocks may be compressed using conventional non-lossy data compression algorithms to further reduce the overall checkpoint size.

5 Claims, 5 Drawing Sheets

U.S. PATENT DOCUMENTS

| | | | |
|---|---|---|---|
| 6,195,760 B1* | 2/2001 | Chung et al. | 714/4 |
| 6,266,781 B1* | 7/2001 | Chung et al. | 714/4 |
| 6,289,474 B1* | 9/2001 | Beckerle | 714/37 |
| 6,691,245 B1* | 2/2004 | DeKoning | 714/6 |
| 6,823,474 B2* | 11/2004 | Kampe et al. | 714/13 |
| 6,892,320 B1* | 5/2005 | Roush | 714/15 |
| 6,895,416 B2* | 5/2005 | Gara et al. | 707/204 |
| 6,952,708 B2* | 10/2005 | Thomas et al. | 707/104.1 |
| 6,959,323 B1* | 10/2005 | Tzeng et al. | 709/205 |
| 7,065,540 B2* | 6/2006 | Chandrasekaran et al. | 707/203 |
| 7,096,392 B2* | 8/2006 | Sim-Tang | 714/48 |
| 7,162,698 B2* | 1/2007 | Huntington et al. | 715/736 |
| 7,197,665 B2* | 3/2007 | Goldstein et al. | 714/20 |
| 7,203,863 B2* | 4/2007 | Pavlik et al. | 714/15 |
| 7,216,254 B1* | 5/2007 | Rajan et al. | 714/20 |
| 7,237,140 B2* | 6/2007 | Nakamura et al. | 714/4 |
| 7,260,590 B1* | 8/2007 | Williams | 707/204 |
| 7,287,180 B1* | 10/2007 | Chen et al. | 714/4 |
| 7,293,200 B2* | 11/2007 | Neary et al. | 714/35 |
| 7,296,039 B2* | 11/2007 | Chandrasekaran et al. | 707/203 |
| 7,313,555 B2* | 12/2007 | Klier | 707/6 |
| 7,356,734 B2* | 4/2008 | Ricart et al. | 714/20 |
| 7,363,537 B1* | 4/2008 | Svarcas et al. | 714/15 |
| 7,363,549 B2* | 4/2008 | Sim-Tang | 714/48 |
| 7,370,223 B2* | 5/2008 | Olmstead et al. | 714/4 |
| 2002/0023129 A1* | 2/2002 | Hsiao et al. | 709/205 |
| 2003/0078933 A1* | 4/2003 | Gara et al. | 707/100 |
| 2003/0115291 A1* | 6/2003 | Kendall et al. | 709/219 |
| 2004/0054800 A1* | 3/2004 | Shah et al. | 709/231 |
| 2004/0103218 A1* | 5/2004 | Blumrich et al. | 709/249 |
| 2004/0153761 A1* | 8/2004 | Lee | 714/15 |
| 2005/0065907 A1* | 3/2005 | Chandrasekaran et al. | 707/1 |
| 2005/0267885 A1* | 12/2005 | Klier | 707/6 |
| 2006/0018253 A1* | 1/2006 | Windisch et al. | 370/216 |
| 2006/0117208 A1* | 6/2006 | Davidson | 714/4 |
| 2006/0282697 A1* | 12/2006 | Sim-Tang | 714/1 |
| 2007/0277056 A1* | 11/2007 | Varadarajan et al. | 714/15 |
| 2008/0126445 A1* | 5/2008 | Michelman | 707/204 |

OTHER PUBLICATIONS

Plank, J.S.; Kai Li, "ickp: a consistent checkpointer for multicomputers," Parallel & Distributed Technology: Systems & Applications, IEEE [see also IEEE Concurrency], vol. 2, No. 2, pp. 62-67, Summer 1994.

Yuqun Chen; Kai Li; Plank, J.S., "CLIP: A Checkpointing Tool for Message Passing Parallel Programs," Supercomputing, ACM/IEEE 1997 Conference, pp. 33-33, Nov. 15-21, 1997.

Bosilca, G; Boutellier, A.; Cappello, F.; Djilali, S.; Fedak, G; Germain, C.; Herault, T.; Lemarinier, P.; Lodygensky, O.; Magniette, F.; Neri, V.; Selikhov, A.; "MPICH-V: Toward a Scalable Fault Tolerant MPI for Volatile Nodes," Supercomputing, ACM/IEEE 2002 Conference, pp. 1-18, Nov. 16-22, 2002.

Tzi-Cker Chiueh; Peitao Deng, "Evaluation of checkpoint mechanisms for massively parallel machines," Fault Tolerant Computing, 1996, Proceedings of Annual Symposium on, vol. no., pp. 370-379, Jun. 25-27, 1996.

Petrini, F.; Davis, K.; Sancho, J.C., "System-level fault-tolerance in large-scale parallel machines with buffered coscheduling," Parallel and Distributed Processing Symposium, 2004. Proceedings, 18th International, vol. no., pp. 209-, Apr. 26-30, 2004.

* cited by examiner

TEMPLATE BASED PARALLEL CHECKPOINTING IN A MASSIVELY PARALLEL COMPUTER SYSTEM

CROSS-REFERENCE TO PARENT APPLICATION

This patent application is a continuation of "APPARATUS AND METHOD FOR TEMPLATE BASED PARALLEL CHECKPOINTING," U.S. Ser. No. 11/106,010 filed on Apr. 14, 2005, which is incorporated herein by reference.

BACKGROUND OF THE INVENTION

1. Technical Field

This invention generally relates to massively parallel computing systems and development, and more specifically relates to an application checkpointing method and apparatus.

2. Background Art

Supercomputers continue to be developed to tackle sophisticated computing jobs. These computers are particularly useful to scientists for high performance computing (HPC) applications including life sciences, financial modeling, hydrodynamics, quantum chemistry, molecular dynamics, astronomy and space research and climate modeling. Supercomputer developers have focused on massively parallel computer structures to solve this need for increasingly complex computing needs. One such massively parallel computer being developed by International Business Machines Corporation (IBM) is the Blue Gene system. The Blue Gene system is a scalable system in which the maximum number of compute nodes is 65,536. Each node consists of a single ASIC (application specific integrated circuit) and memory. Each node typically has 512 megabytes of local memory. The full computer would be housed in 64 racks or cabinets with 32 node boards in each. Each node board has 32 processors and the associated memory for each processor.

The Blue Gene supercomputer's 65,536 computational nodes and 1024 I/O processors are arranged into both a logical tree network and a logical 3-dimensional torus network. ! Blue Gene can be described as a compute node core with an I/O node surface. Each I/O node handles the input and output function of 64 compute nodes. The I/O nodes have no local storage. The I/O nodes are connected to the compute nodes through the tree network and also have functional wide area network capabilities through its built in gigabit ethernet network.

On a super computer system like Blue Gene, the mean time before failure of any hardware or software component may be measured in hours and the complex computing programs describe above may take several hours to several days to run. If a machine is brought down for maintenance, software upgrades, or because an application crashes there needs to be a way to store the current state of the computer so that execution can resume where it left off when the hardware is able to continue executing. The process of saving the state of a running application is known in the art as checkpointing. Thus, checkpointing the application saves the state of the application in a recoverable fashion so that the application can continue from the checkpoint location. The traditional way to do checkpointing is to take a memory "snapshot" of the application and save this image to disk. This can be accomplished either by system level checkpointing, or by using application level checkpointing libraries.

On Blue Gene, there is a scalability issue of checkpointing 65,536 compute node processors to persistent storage. Each compute node has 512 megabytes (up to 2 GB) of memory, or in total 32 gigabytes of memory per I/O node. In all there are 1024 I/O nodes, each potentially handling 32 gigabytes of checkpoint data, for a total of 32 terabytes stored to disk. Checkpointing causes an incredible load on the storage system and interconnect. Prior art techniques to overcome the checkpoint storage problems include incremental checkpointing or difference based checkpointing. Compression of the checkpoint storage but may be combined with these other checkpointing methods.

Incremental checkpointing or difference based checkpointing is a method to save only the differences between previous checkpoints. In this method, differences are calculated at each of the nodes from a template file or previous checkpoint. Each node saves its difference file through the file system to disk. Typically, the difference calculation requires both the template file and the data file to be available to the CPU, and thus the template file must be transferred to each compute node. Each node must then calculate differences from the template file, using significant aggregate CPU and bandwidth.

Without a way to checkpoint massively parallel computer systems that does not require the template file and the data file available to the CPU the super computers will need to continue to use a burdensome amount of network bandwidth and CPU time to checkpoint the progress of the software application.

DISCLOSURE OF INVENTION

According to the preferred embodiments, a method and apparatus for parallel rsync-based checkpointing is described for a massively parallel super computer system. Embodiments herein include a parallel variation of the rsync protocol, compression and network broadcast to improve application checkpointing in a massively parallel super computer environment. In preferred embodiments, the checkpoint data for each node is compared to a template checkpoint file that resides in the storage and that was previously produced by a memory dump or previous checkpoint of the application. Embodiments herein greatly decrease the amount of data that must be transmitted and stored for faster checkpointing and increased efficiency of the computer system.

The disclosed embodiments are directed to the Blue Gene architecture but can be implemented on any cluster with a high speed interconnect that can perform broadcast communication. Embodiments herein are directed to a checkpoint that represents the entire content of memory, or a specified portion of the memory from all compute nodes in the cluster. The checkpoint contains a set of actual data blocks each of small size with their corresponding checksums. These data blocks represent data from all nodes in the system. For each node in the system the checkpoint contains a list or template of references to these data blocks such that if the actual data blocks were collected together in order they would represent the memory image of that node. The data blocks may be compressed using conventional non-lossy data compression algorithms to further reduce the overall checkpoint size.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

DETAILED DESCRIPTION

The present invention relates to an apparatus and method for checkpointing a massively parallel computer system using a parallel variation of the rsync protocol with a rolling checksum algorithm. The rsync Overview Section immediately below is intended to provide an introductory explanation of basic rsync concepts for individuals who need additional background in this area. Those who are skilled in the art may wish to skip this section and begin with the Detailed Description Section instead.

Recent developments have been made on a method to save incremental differences of a computer file from one machine to another machine without transmitting an entire memory image from one machine to another. This method is called "rsync". The rsync software and method is open source. Information about rsync is widely available. The rsync method uses an "rsync algorithm" which provides a very fast method for bringing remote files into synchronization. It does this by sending just the differences in the files across the link, without requiring that both sets of files are present at one of the ends of the link beforehand. The rsync algorithm addresses the problem where the prior methods for creating a set of differences between two files relied on being able to read both files on the same machine.

The rsync algorithm can be stated as follows: Given two computers a and b. Computer a has access to a file A and computer b has access to file B, where files A and B are "similar" and there is a relatively slow communications link between a and b. The rsync algorithm consists of the following steps:

1. Computer b splits the file B into a series of non-overlapping fixed-sized blocks of size S bytes. The last block may be shorter than S bytes.
2. For each of these blocks b calculates two checksums: a weak "rolling" 32-bit checksum (described below) and a strong 128-bit MD4 checksum.
3. b sends these checksums to a.
4. a searches through A to find all blocks of length S bytes (at any offset, not just multiples of S) that have the same weak and strong checksum as one of the blocks of B. This can be done in a single pass very quickly using a special property of the rolling checksum described below.
5. a sends b a sequence of instructions for constructing a copy of A. Each instruction is either a reference to a block of B, or literal data. Literal data is sent only for those sections of A which did not match any of the blocks of B.
6. Computer b writes an updated file by interpreting the instructions received in step 5. The result is an identical copy of file A.

The end result is that B gets a copy of A, but only the pieces of A that are not found in B (plus a small amount of data for checksums and block indexes) are sent over the link. The algorithm also only requires one round trip, which minimizes the impact of the link latency. An important aspect of the algorithm is the rolling checksum and the associated multi-alternate search mechanism which allows the all-offsets checksum search to proceed very quickly. Further details of the rolling checksum and search mechanism are widely available on the internet and are not described in detail herein.

In accordance with the present invention, a method and apparatus is described for a massively parallel super computer system to perform template based checkpointing using a parallel application of a rolling checksum algorithm. Embodiments herein include an application of the rsync protocol, compression and network broadcast to improve application checkpointing in a massively parallel super computer environment. Embodiments herein greatly decrease the amount of data that must be transmitted and stored for faster checkpointing and increased efficiency of the computer system.

Figure 1:
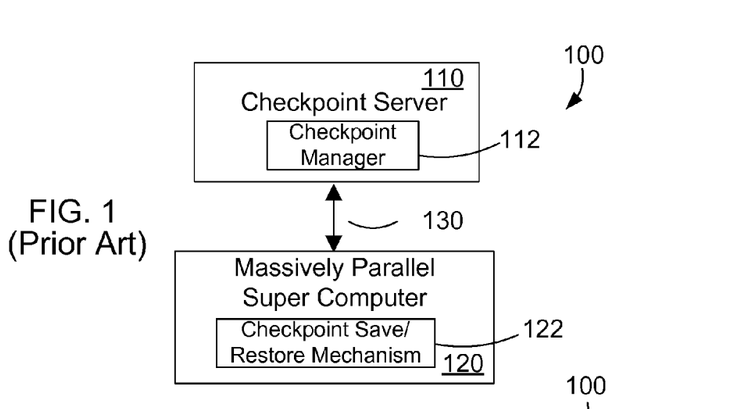
FIG. 1 is a block diagram of a computer system according to the prior art.

FIG. 1 shows a block diagram that represents a prior art computer system 100 such as the Blue Gene computer system. A checkpoint server 110 is connected to the super computer system 120 through one or more communication links 130. The super computer system 120 executes an application program to solve a problem as described in the background. In the Blue Gene computer system, one of the communication links 130 that connects the checkpoint server 110 to the super computer system 120 is essentially a standard ethernet network connection. The Blue Gene computer system includes several other communication links and networks that connect the computer system that are not particularly pertinent to the present invention. In other embodiments the checkpoint server may encompass multiple entities. For example, each physical checkpoint server may be a checkpoint server for a group of I/O nodes and communicate with the other checkpoint servers.

Figure 2:
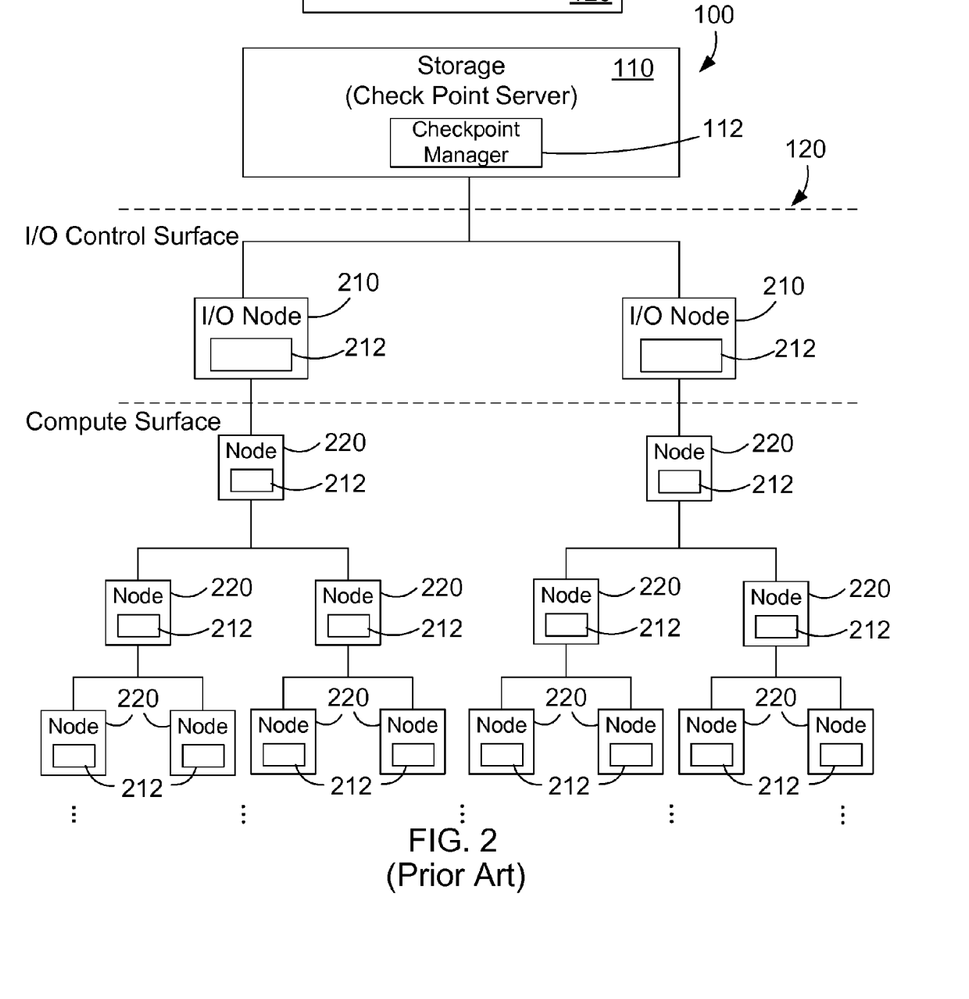
FIG. 2 is a block diagram of a massively parallel computer system according to the prior art.

FIG. 2 shows a block diagram that represents the logical tree network 200 of a computer system such as the Blue Gene computer system. The compute nodes in the cluster are organized into a tree hierarchy as shown. The top of the logical tree network is a storage device connected to the computer at an I/O control surface of the computer. The checkpoint server is a non-compute node that is the topmost node of the tree hierarchy. The checkpoint server is connected to the I/O nodes of the computer system 100 for the tree network by an interface 210. Each of the I/O nodes is connected to a first compute node at the compute surface of the computer. Each compute node except for the last level (not shown) may have one or two children nodes 220 in a tree structure. The nodes are shown with a balanced tree with two children each for simplicity. Each I/O node has 64 total compute nodes in the tree (not all are shown).

Figure 3:
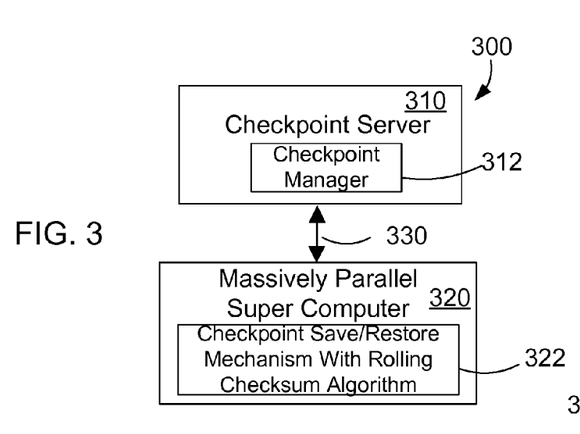
FIG. 3 is a block diagram of a computer system according to preferred embodiments.

FIG. 3 shows a block diagram that represents a computer system 300 such as the Blue Gene computer system using a checkpoint save/restore mechanism 322 per embodiments described herein. The checkpoint server 310 is connected to the super computer system 320 through one or more communication links 330. The super computer system 320 executes an application program to solve a problem as described in the background. The described embodiments herein are directed to the Blue Gene architecture but can be implemented on any cluster of compute nodes with a high speed interconnect that can perform broadcast communications.

Figure 4:
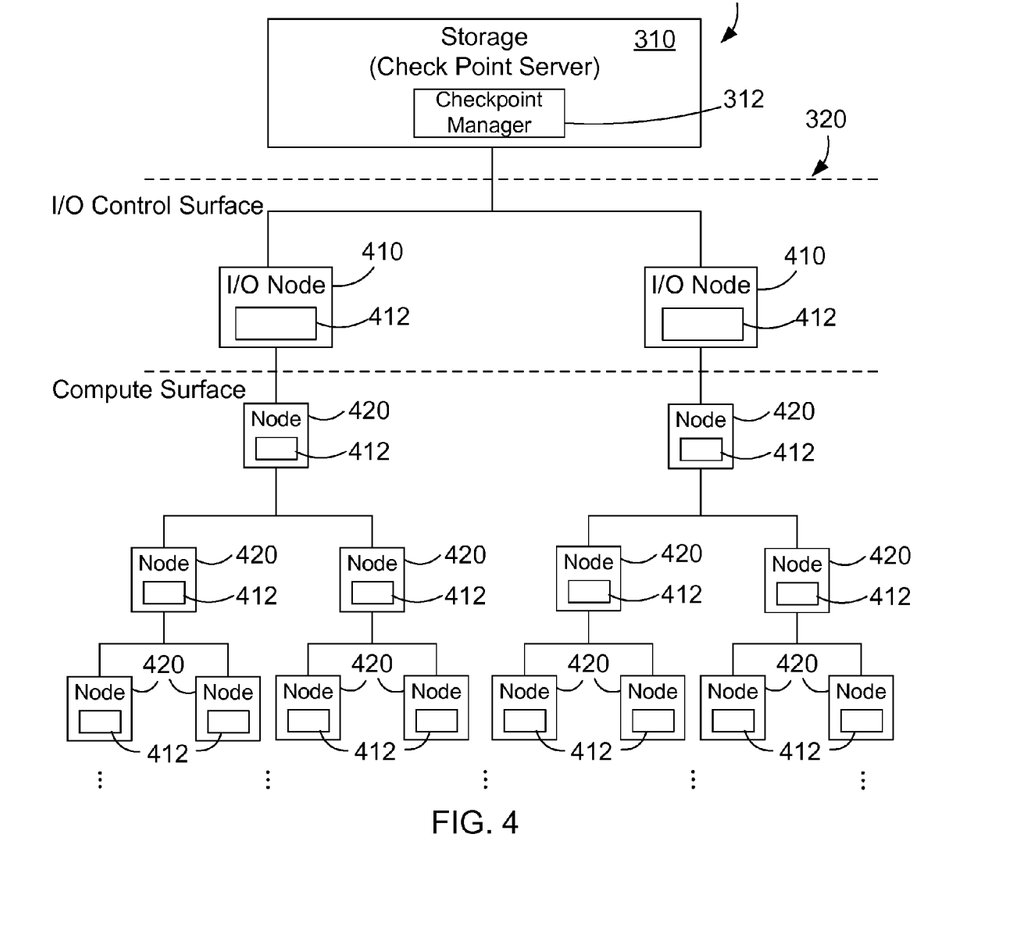
FIG. 4 is a block diagram of a massively parallel computer system according to preferred embodiments.

FIG. 4 shows a block diagram that represents the massively parallel computer system 320 arranged in a logical tree network 420 where each I/O node 410 and each compute node 420 incorporates a checkpoint save/restore mechanism 412 according to an embodiment herein. The overall computer system structure is the same as that described above. The compute nodes in the cluster are organized into a tree hierarchy as shown. The top of the logical tree network is a storage device connected to the computer at an I/O control surface of the computer. The checkpoint server is a non-compute node that is the topmost node of the tree hierarchy. The checkpoint server is connected to the I/O nodes 210 of the computer system 300 in a tree network. Each of the I/O nodes 410 is connected to a first compute node 410 at the compute surface 420 of the computer. Each compute node except for the last level (not shown) may have one or two children nodes in a tree structure. The nodes are shown with a balanced tree with two children each for simplicity. Each I/O node has 64 compute nodes in the tree. In the Blue Gene computer system, one of the communication links 330 that connects the checkpoint server 310 to the super computer system 320 is essentially a standard ethernet network connection. The Blue Gene computer system includes several other communication links and networks that connect the computer system that are not particularly pertinent to the present invention.

The check point server 310 collects and stores a checkpoint of the super computer system 320 as described below. The checkpoint represents the content of memory of all compute nodes in the cluster. In the specific case of Blue Gene this will be 65,536 nodes each containing 512 megabytes (up to 2 GB) of memory. The checkpoint contains a set of small sized data blocks with their corresponding checksums. These data blocks represent data from all nodes in the system. For each node in the system the checkpoint contains a list of references or a template to these data blocks such that if the actual data blocks were collected together in order they would represent the memory image of that node. Since there is much commonality to the content between the nodes in the system (because they are running the same parallel application) the template of references between any pair of nodes will contain much overlap of actual data blocks. Thus, the actual pool of data blocks will be significantly smaller in size than the sum total of memory in the cluster.

In preferred embodiments, the stored checkpoint represents the entire content of memory, or a specified portion of the memory from all compute nodes in the cluster. Checkpointing the entire memory provides a system checkpoint. A specified portion less than the entire memory may be used to provide an application checkpoint, or a checkpoint of a subset of an application. The checkpoint contains a set of actual data blocks each of small size with their corresponding checksums. These data blocks represent data from all nodes in the system. For each node in the system the checkpoint contains a template of references to these data blocks such that if the actual data blocks were collected together in order they would represent the memory image of that node. Further, the data blocks may be compressed using conventional non-lossy data compression algorithms to further reduce the overall checkpoint size.

In preferred embodiments, the compute nodes in the cluster are organized into a tree hierarchy as shown but could be organized using other network topologies such as proximity to each other on the network (subnet) or by blade of a switch.

The top of the logical tree network is a storage device connected to the computer at an I/O control surface of the computer. In the preferred embodiment described herein, the storage device includes a check point server 310 as shown in FIG. 4. The checkpoint server is a non-compute node that is the topmost node of the tree hierarchy. The checkpoint server is connected to the I/O nodes of the computer system 100 for the tree network by an interface 330. In Blue Gene, this network is an ethernet network. Each of the I/O nodes is connected to a first compute node at the compute surface of the computer. Each compute node except for the last level (not shown) has two children nodes in a tree structure as shown. Each I/O node has 64 compute nodes in the tree. On a general purpose cluster the checkpoint server could be a compute node of the same cluster.

The checkpoint server usually begins with a previously written checkpoint. Since the data in all nodes is often the same when processing begins, the first checkpoint is generated as a data image that can be read or computed by the checkpoint server without extensive communication with the compute nodes. In the case of an application this will be the executable program image, or in the case of a partial application data checkpoint it may just assume an image of all zeros. This initial checkpoint is this memory image broken into data blocks and all nodes contain the same list of references to these data blocks. The list of data block checksums for each node form a template to recreate the memory using the stored data blocks.

The checkpoint save/restore mechanism described above can be implemented as a system kernel of code residing in each of the I/O nodes and compute nodes. The save restore mechanism performs the procedures described below to save the state of the computer system or a checkpoint on the checkpoint server.

Figure 5:
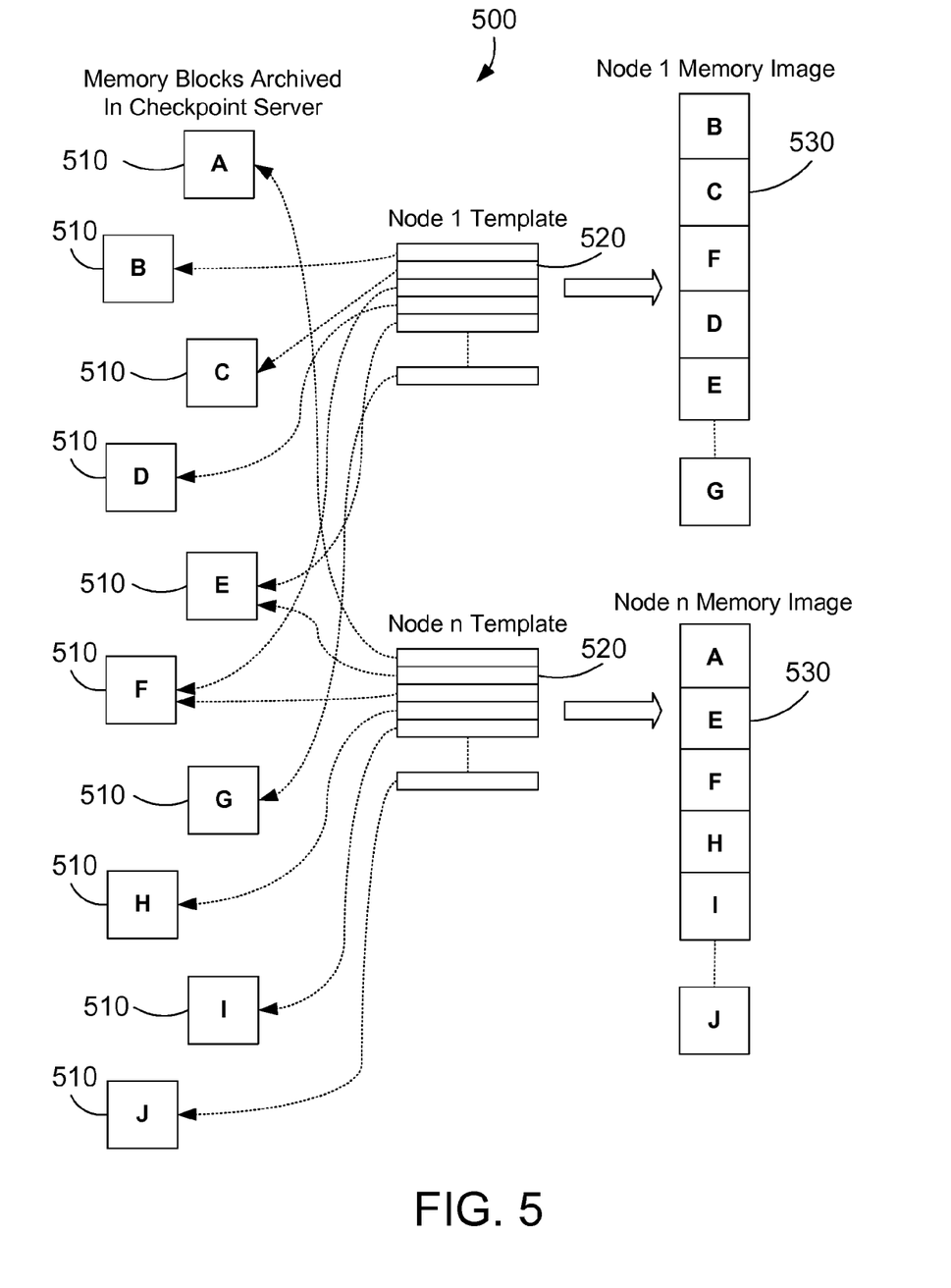
FIG. 5 is a diagram of a checkpoint structure showing check point memory blocks, memory templates and their associated memory images according to a preferred embodiment.

FIG. 5 shows a diagram of a checkpoint structure 500 showing check point memory blocks 510, memory templates 520 and their associated memory images 530 according to a preferred embodiment. The memory blocks 510 are archived on the checkpoint server 310 (FIG. 3). Each memory block 510 is preferably unique. The memory blocks 510 shown in FIG. 5 are given an alphabetic identifier (A through J) for illustration and discussion. Each node in the system has a template 520 that serves to identify which of the memory blocks stored in the checkpoint server 310 make up the memory of the respective node. The template holds a list of pointers or numbers in the order of the memory image that point to the memory blocks 510. The template can be used to assemble a memory image 530 for the associated node. The process to create the template, the memory archive and to restore the memory image are described further below.

The process to save a checkpoint on the checkpoint server by the checkpoint save/restore mechanism will now be described. At some point in execution the application decides it is time to create a checkpoint. To do this, the application saves the necessary state into its own memory and initiates the checkpoint. One of the nodes in the application notifies the checkpoint server to begin checkpoint. The checkpoint server responds by broadcasting the list of data block checksums to all compute nodes in the cluster. The compute nodes then search their own memory image for checksum matches using the rsync protocol rolling checksum algorithm. This is very compute intensive but the nodes are able to perform this step in parallel with each other so a 65,536 node system will finish in the same time as a single node system. When each compute node is finished analyzing its own memory image it will produce a template of new data blocks with checksums that didn't exist in the previous checkpoint, and it will produce a template of references to the original data blocks that did exist in the previous checkpoint.

The checkpoint continues by each node sending its updated checksum template to its parent node in the hierarchy of nodes. Each node receives the checksum template from all of its children in the hierarchy. If a node has no children it will skip this step. By comparing checksums this node finds common data blocks between all children as well as its own data blocks. Note that all nodes at this level of the hierarchy are executing this step in parallel with each other. Once it has found common blocks by comparing these checksums it informs the children of this fact telling them to replace its reference to such a data block with a reference to a data block on another node (either another child or the parent).

The process is repeated by having each node send the complete checksum template to its parent until the top of the hierarchy is reached. The top of the hierarchy will be the checkpoint server. Note that non-compute nodes, such as the checkpoint server, can be part of the checkpoint hierarchy. A non-compute node will perform the same steps except it has no local data checksums to compare against child data checksums. But it can still perform the other steps. In Blue Gene the I/O nodes would be non-compute nodes that are part of the hierarchy. Once the checkpoint server is reached in the hierarchy all common data blocks will be identified and all compute nodes will have been notified to update their reference templates. At this point the checkpoint server will collect those reference templates from the compute nodes. These templates are very small compared to the overall memory images of the compute nodes. These templates are stored in the checkpoint.

Finally, the checkpoint server asks for the data for the new unique data blocks that were not part of the original checkpoint image. The compute nodes send this data to the checkpoint server after first compressing the data using standard compute-intensive data compression algorithms. The compression occurs in parallel on the nodes that have the data. Once the data is received and stored the checkpoint operation is complete and the compute nodes are resumed.

Figure 6:
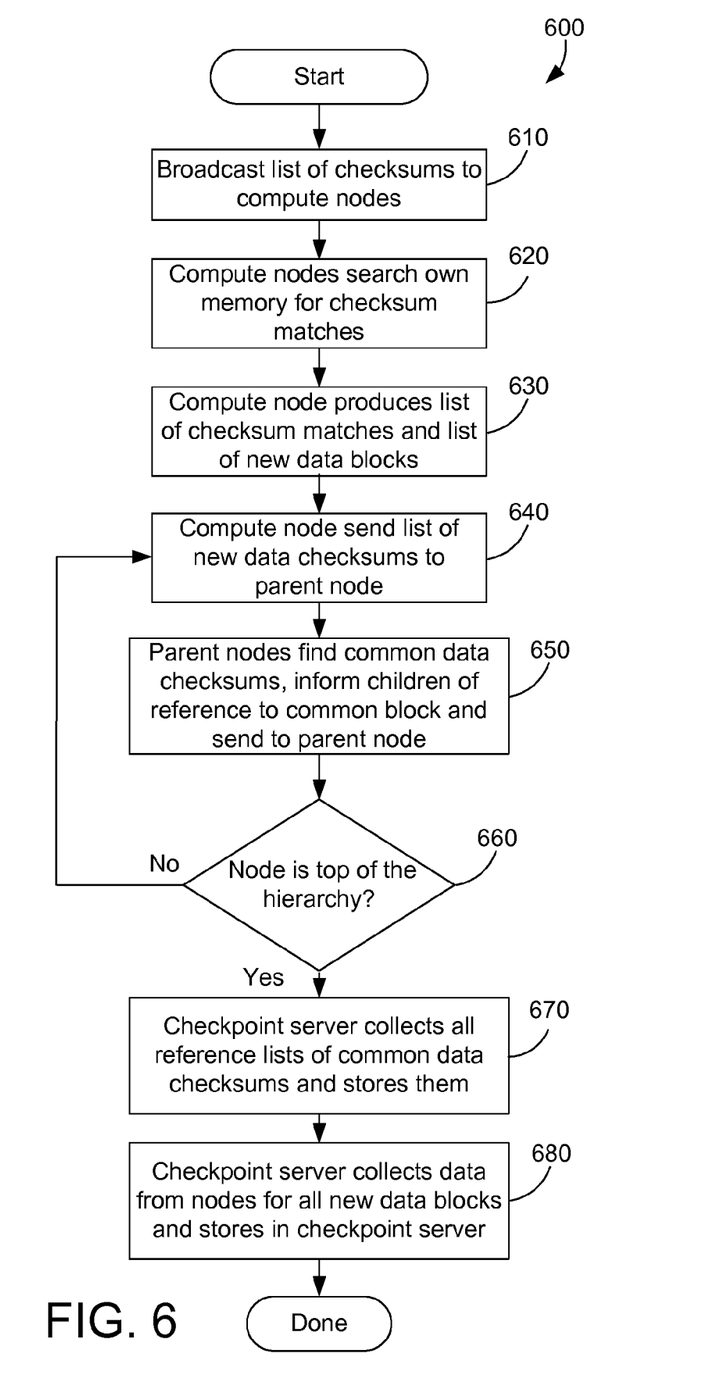
FIG. 6 is a method flow diagram for checkpointing a massively parallel computer system according to a preferred embodiment.

FIG. 6 shows a method 600 of parallel checkpointing according to embodiments herein. The checkpoint server starts the checkpoint when instructed by the application or otherwise as described above. The checkpoint server first broadcasts the template of data block checksums to all compute nodes in the cluster (step 610). The compute nodes then search their own memory image for checksum matches using the rsync protocol rolling checksum algorithm (step 620). After each compute node analyzes its own memory image it produces a template of new data blocks with checksums that didn't exist in the previous checkpoint, and a template of references to the original data blocks that did exist in the previous checkpoint (step 630). Each compute node then sends its new data block checksum template to its parent node in the hierarchy of nodes (step 640). Nodes receive the checksum template from all of its children in the hierarchy and find common data blocks between all children as well as its own data blocks, informs the children to replace its reference to common data block with a reference to a data block on another node (step 650). The process is repeated by having this node send the complete checksum template to its parent until the top of the hierarchy is reached (step 660=no). Once the top of the hierarchy (checkpoint server) is reached (step 660=yes), the checkpoint server will collect those reference templates from the compute nodes and store them in the checkpoint server (step 670). Finally, the checkpoint server asks for the data for the new unique data blocks that were not part of the original checkpoint image from the compute nodes and stores them (step 680). The method of checkpointing is then complete and the application can proceed with normal processing.

Other Embodiments of the Checkpoint Save

The compute nodes could maintain a local cache of checksums from a previous checkpoint so the broadcast may be eliminated. Since caching the checksums takes additional storage this may be done on some or all the clusters where storage is available. The final checkpoint image may contain a "history" of checkpoint images. This is implemented by archiving the node reference templates from previous checkpoints. This may actually increase efficiency if nodes return to previous memory state after a period of execution (or if the state moves from one node to another). This also allows the application to be "rolled back" to previous checkpoints for analysis or debug.

Storage of the new data blocks can be performed in parallel. For example, in Blue Gene the compute nodes might forward the data to the IO nodes and the I/O nodes will store the data to unique storage servers leveraging 1024 gigabit network lines rather than funneling through a single gigabit ethernet line.

The checkpoint server does not need to actually see the data blocks. All it needs are the checksums of the data blocks. So, the data blocks can be stored on auxiliary storage servers tuned for that purpose. The checkpoint server itself may leverage a high speed database to track the references. The checkpoint is not limited to an application image. The checkpoint could be a subset of data to be stored by an application, or the checkpoint could be a memory image for a system crash dump.

The pool of data blocks could be common across checkpoints of differing applications. This may be useful if applications share a large amount of common code. Further, the references templates can be optimized by exploiting commonality. They could be divided into "references of references" so that a subset of the template can be shared. For example, the reference template for the memory containing application instructions is unlikely to change between nodes and this subset of the reference template could be shared. If the reference templates are large enough they could be treated as a memory image and the entire algorithm repeated over this memory image.

Parallel Checkpoint Restore

When the computer system needs to recover from an error or when directed by a system operator, the last stored checkpoint can be used to restore the computer system to the conditions of the stored checkpoint. Restoring a checkpoint uses the stored reference template for each node. The checkpoint server performs the restore as follows. The checkpoint server first sends reference template to each node in the system. Each compute node receives its reference template and prepares to receive broadcast data from the checkpoint server. For each data block referenced by the union of all compute node reference templates, the checkpoint server broadcasts that data block onto the network. For each data block received via broadcast each compute node examines its reference template to see if it refers to this data block. If the data block is referenced (perhaps multiple times in the template), the compute node copies the data block contents into place in memory. Once all data blocks have been broadcast, the checkpoint server broadcasts a start message. This message implies that the restore is complete and the compute nodes should begin processing to their saved location which is part of the restored memory image.

Figure 7:
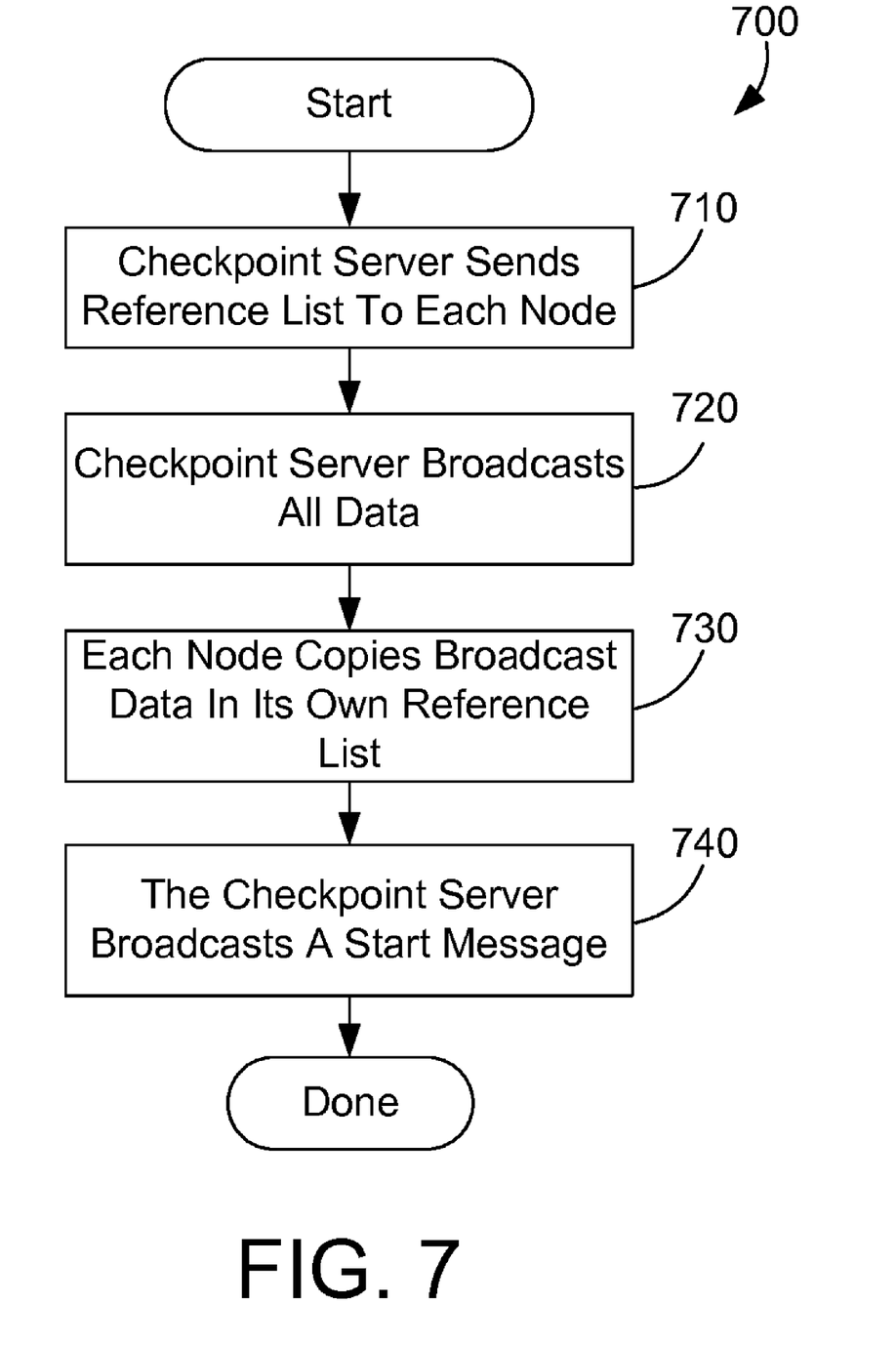
FIG. 7 is a method flow diagram for restoring a massively parallel computer system to a checkpoint according to a preferred embodiment.

FIG. 7 shows a method 700 of a parallel checkpoint restore according to embodiments herein. The checkpoint server starts the checkpoint restore when instructed by the application or otherwise as described above. The checkpoint server first sends the reference template of the data blocks to each compute node (step 710). The checkpoint server then broadcasts the reference template of data block checksums to all compute nodes in the cluster (step 720). The compute nodes copy data from the broadcast for checksum that matches its own reference template (step 730). The checkpoint server then broadcasts a message to start the application from the point of the now restored checkpoint (step 740).

As described above, embodiments provide a method and apparatus for parallel rsync-based checkpoint for a massively parallel super computer system. Embodiments herein greatly decrease the amount of data that must be transmitted and stored for faster checkpointing and increased efficiency of the computer system to solve the prior art problem of network bandwidth and CPU time needed to checkpoint the progress of the software application. The present invention leverages off of the prior art that used checksum algorithms like rsync to copy a computer file from one machine to another. In contrast, the preferred embodiments describe a method and apparatus for making a template checkpoint of the computer memory in a massively parallel computer system using a checksum algorithm such as rsync applied in a parallel fashion.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A computer implemented method for checkpointing a massively parallel computer system comprising the steps of:
   a) a checkpoint server broadcasting a list of data block checksums from a previous checkpoint to all compute nodes arranged in a cluster; and
   b) each compute node searching its own memory image for checksum matches using an rsync protocol rolling checksum algorithm;
   wherein each node performs the steps of:
      1) producing a template of new data blocks with checksums that didn't exist in the previous checkpoint;
      2) producing a template of references to the original data blocks that did exist in the previous checkpoint;
      3) sending its new data block checksum template to an adjacent node in the cluster of nodes;
      4) comparing checksums to find common data blocks between all adjacent nodes as well as its own data blocks;
      5) informing adjacent nodes to replace a reference to a common data block with a reference to a data block on another node;
   c) the checkpoint server then collecting reference templates from the compute nodes and storing them in the checkpoint server; and
   d) collecting new unique data blocks and storing them to the checkpoint server.

2. The computer implemented method of claim 1 wherein the step of storing the data blocks stores the data on auxiliary storage servers instead of the checkpoint sewer.

3. The computer implemented method of claim 1 wherein the step of storing the data blocks stores uses the I/O nodes to store the data to unique storage servers over network lines to the I/O nodes rather than funneling the data through a network line to the checkpoint server.

4. The computer implemented method of claim 1 further comprising the step of sharing a subset of the reference template from a first application to a second application.

5. The computer implemented method of claim 1 further comprising the steps of:
   a) the checkpoint server sends a reference template of data block checksums from a previous checkpoint to a plurality of compute nodes in a cluster to restore a memory of the massively parallel computer system;
   b) the checkpoint server broadcasts data blocks to the nodes;
   c) each node copies broadcast data according to its own template of data block checksums; and
   d) the checkpoint server broadcasts a staff message.

* * * * *